INVENTORS
C.J. ENGLE
S.J. MARWIL
BY Hudson & Young
ATTORNEYS

INVENTORS
C. J. ENGLE
S. J. MARWIL
BY Hudson A. Young
ATTORNEYS

United States Patent Office 2,919,898
Patented Jan. 5, 1960

2,919,898
TREATMENT OF WELL DRILLING MUD

Stanley J. Marwil and Charles J. Engle, Bartlesville, Okla., assignors to Phillips Petroleum Company, a corporation of Delaware Application August 16, 1957, Serial No. 678,680

17 Claims. (Cl. 255—1.8)

This invention relates to improved systems and processes for the treatment of well drilling mud. In one aspect it relates to the conservation and concentration of the more expensive ingredients of the well drilling mud. In another aspect it relates to the separation and discard of unwanted and deleterious materials which are picked up from the formation by the drilling mud during the well drilling operation, which materials tend to accumulate in the mud and destroy its value. In another aspect it relates to conservation of the weighting materials, such as barium sulfate.

In the process of earth boring employing well drilling mud, such as the conventional rotary drilling process illustrated, the rotated drill bit grinds the formation at the bottom of the well into cuttings of various sizes, and depending upon the solubility and dispersibility of the particles of the particular formation involved, coarse sand, fine sand, and clay are added by said grinding to said well drilling mud as dispersed solids, and some salts in said formation, such as sodium chloride, dissolve completely in the mud and become part of its liquid phase. The presence and/or amount of these materials added to the mud from the formation during drilling varies greatly with the formations penetrated, but often any one or more of these added materials accumulate in the well drilling mud in sufficient quantities to make the drilling mud unusable unless treated to remove the undesirable ingredients, or reduce their proportions by adding further mud ingredients.

In the prior art it has been customary to just throw away large portions of the contaminated mud, and replace the same with water, and new supplies of mud weighting agent and liquid chemicals. This is a very wasteful and expensive practice, but prior to the present invention there has been no successful means of otherwise treating the mud. As a result of the great amount of mud weighting materials being discarded in the prior art, the supply of barium sulfate in the United States is approaching a critical shortage and large volumes are being imported. By the practice of the present invention, large quantities of this weighting material are salvaged, resulting in a considerable savings in money and in conservation of a natural resource, namely natural barium sulfate deposits in this country.

One object of the present invention is to provide an improved system and improved processes for treating well drilling mud.

Another object is to provide an improved system and process for earth boring by hydraulic drilling processes embodying systems and processes for treating the well drilling mud.

Another object is to concentrate and conserve the relatively expensive weighting materials present in the well drilling mud.

Another object is to concentrate and separate the undesirable materials added to the drilling mud during the drilling of the formation, such as coarse sand, fine sand, and clay, and undesirable salts when the same may be present in excessive amounts.

Numerous other objects and advantages will be apparent to those skilled in the art, upon reading the accompanying specification, claims, and drawings in which:

Figure 1:
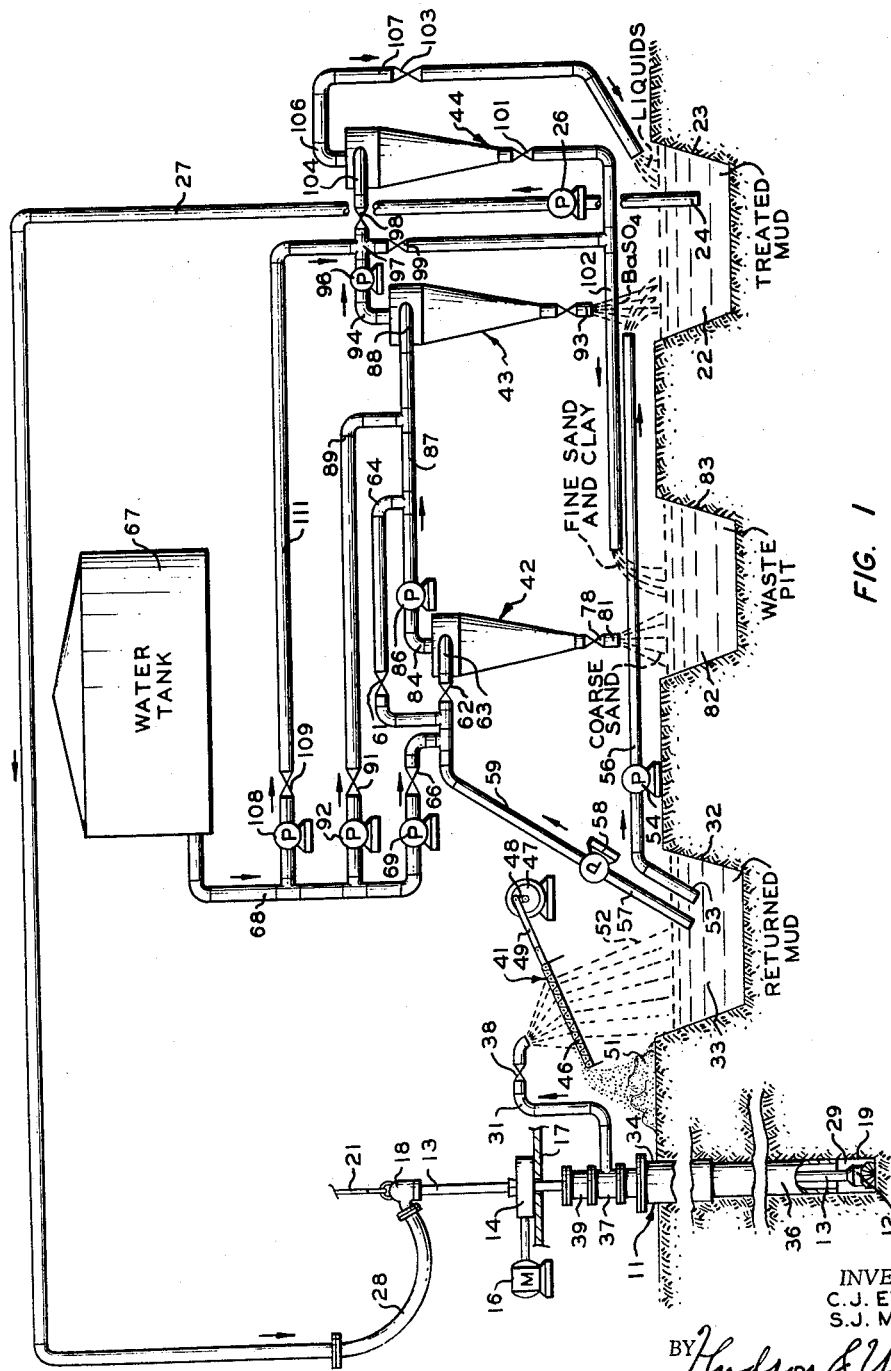
Figure 1 is a diagrammatic view of a hydraulic rotary well drilling system and well drilling mud treating system embodying the present invention.
Figure 4:
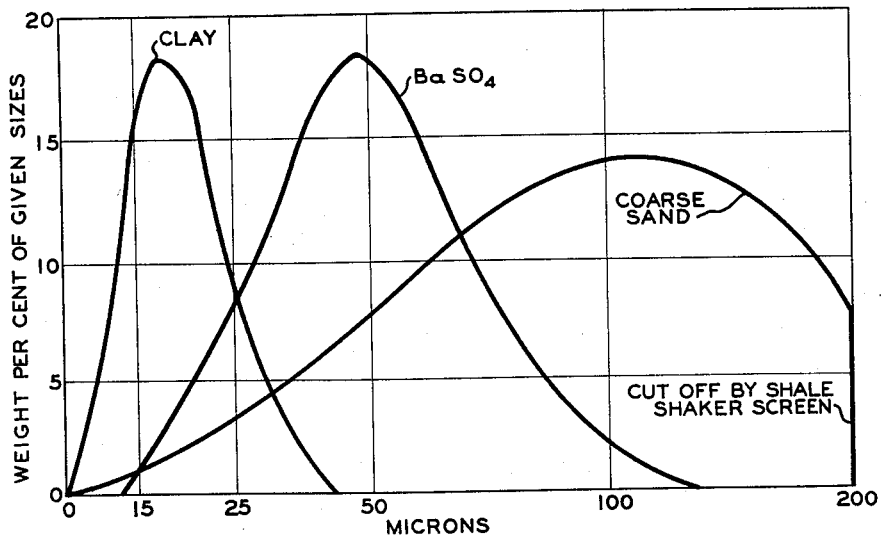

Figure 4 is a graphical representation of the particle distribution in a typical hypothetical return mud coming from an earth boring process such as shown in Figure 1, giving the typical expected weight percent distribution of the various types of particles suspended in the mud according to their equivalent spherical diameter, the latter taking into account the different specific gravities of the materials involved.

In Figure 1, a well generally designated as 11 is being drilled by the conventional hydraulic rotary drilling process. In this process a conventional rotary drill bit 12 is secured to and rotated by a hollow drill stem 13, which is rotated by rotary table 14 driven by motor 16 mounted on the floor 17 of a well drilling rig or derrick (not shown). The drill stem 13 has a non-rotating but longitudinal slidable fit in table 14, and a rotating swivel connection with the usual rotary hydraulic swivel 18, and drill stem 13 may be lowered into the well 19 by paying out cable 21 from the usual draw-works (not shown).

Well drilling mud 22 from mud container 23, which may be a pit in the ground as shown, or which can be a metal tank (not shown) is withdrawn through suction line 24 by mud pump 26 and is forced through mud standpipe 27, and through flexible hose connection 28 and hydraulic swivel 18 into the interior of drill stem 13. The well drilling mud goes down the interior of 13 and comes out openings (not shown) in drill bit 12, where it picks up cuttings in well 19 produced by bit 12 and carries the same up the annular space 29 and out the overflow pipe 31 into mud container 32, where it may be designated as returned mud 33.

While it is possible to operate with the well 19 merely as a hole in the ground and let the return mud emerge from this hole and find its way over the ground to mud return pit 32 and still practice the present invention, it is obviously better to use the usual refinements in drilling employed in the prior art, such as inserting a soil pipe 34 in the well 19, along with one or more concentric casings 36 connected to a casing head 37 which is connected to discharge pipe 31, which pipe 31 may contain a valve 38 which may be employed to put back-pressure on the returning well drilling mud. To prevent the escape of well drilling mud around drill stem 13 a rotary stuffing box, or well blowout preventer 39, of conventional construction may be employed.

While the most used direction of circulation of the well drilling mud has been shown in well 11 of Figure 1, known as "direct circulation," in many wells "reverse circulation" (not shown) is employed, and of course cooperates in the same manner with present invention, reverse circulation being easily attained by connecting stand pipe 27 with pipe 31 and disconnecting pipe 28 from pipe 27 and moving pipe 28 over to discharge into mud pit 32, the mud then being pumped down the annular space 29, into the openings in drilling bit 12, and up the interior of hollow drill stem 13 and out through pipe 28 into mud pit 32.

It is not essential in the practice of the invention to employ any shale shaker, or screen, generally designated as 41, because the hydraulic cyclone separators generally designated as 42, 43 and 44 are very rugged in their operation, and will handle any material pumped to them. The interior of these hydraulic cyclone separators 42, 43 and 44 is the same as 42a shown in Figures 2 and 3, being called 42a instead of 42 only because the tangential inlet 63 is shown in the rear portion of 42a instead of the front portion of 42, giving clockwise rotation when viewed from above instead of counterclockwise rotation. This makes absolutely no difference in the operation. However, it is obvious that operating without the shale shaker 41 place an unnecessary load on the hydraulic cyclones, when it is so easy to first remove all the well cuttings of larger diameter than 200 microns by means of shale shaker 14, which comprises an ordinary metal screen 46 which could be stationary, but which operates much more efficiently when vibrated or reciprocated by any suitable means such as electric motor 47, crank 48, and pitman 49. The returned pieces of rock and the cuttings from bit 12 dance across the surface of screen 46 under the influences of gravity, inertia, and movement of the screen, and fall into a pile 51 on the surface of the ground, whereas all the finer solid and liquid portions 52 of the well drilling mud fall into the mud pit 32 where they are known as returned mud 33.

When the system is first being operated the returned mud 33 is substantially the same as treated mud 22, and so it is unnecessary to start the hydraulic cyclone separation system, so the returned mud 33 is picked up by intake 53 and pumped by pump 54 through transfer line 56 into the treated mud 22 in pit 23. Furthermore, it has been found that it is not necessary to run all of the mud through the mud treating system, although this can be done, if desired, so that generally part of the mud is being pumped through line 56 at all times, while another portion of the mud is taken from pit 32 through intake 57 of pump 58 and is being treated in one or more of hydraulic cyclones 42, 43 and 44.

Naturally, the treatment of the mud pumped into the manifold 59 by pump 58 depends upon the condition of returned mud 33, and relative amounts of the various materials contained therein. If it contains an appreciable amount of coarse sand, valve 61 is closed and valve 62 is opened and the mud in line 59 passes tangentially into hydraulic cyclone separator 42 through line 63, but if there is substantially no coarse sand, valve 62 is closed and valve 61 is opened and the drilling mud bypasses cyclone separator 42 through bypass pipe 64. When the hydraulic separator 42 is being operated, the separation therein may be facilitated, if desired, by opening valve 66 and pumping water from water tank 67 through manifold 68 and pump 69 to the mud passing through lines 59 and 63.

Figure 2:
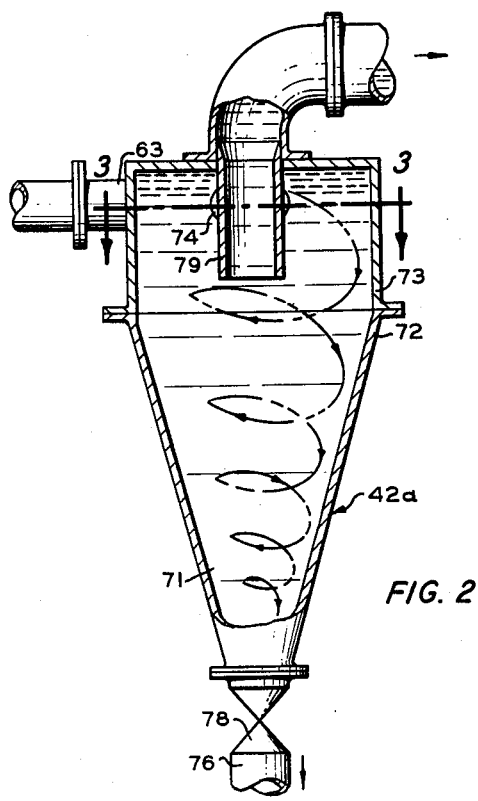
Figure 2 is a cross-sectional elevational view of any one of the three liquid cyclone separators shown in Figure 1.
Figure 3:
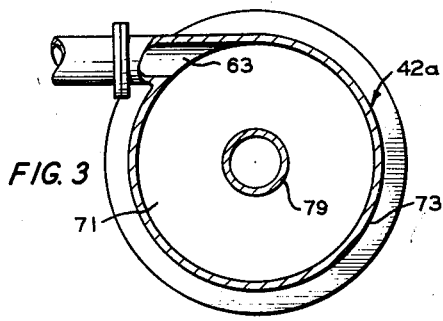
Figure 3 is a cross-sectional view of the apparatus shown in Figure 2 taken along the line 3—3 looking in the direction indicated.

In Figure 3 the operation of the hydraulic cyclone separator 42a is the same as that of separators 42, 43 and 44 of Figure 1, except as pointed out above, for ease of illustration, tangential inlet 63 is shown in the rear half of separator 42a in Figure 2 where the separator is in cross-section, whereas it is shown in the front half in Figure 1, where it is more easily illustrated in an elevational view. The direction of rotation is without any significance.

In Figure 2 the separator 42a comprises a generally conical chamber 71 which may be formed from one or more body members 72 and 73, connected together as shown. Chamber 71 has an inlet opening 74 through which the drilling mud is injected generally tangentially into chamber 71 through pipe 63. Adjacent to the apex portion of chamber 71 is an underflow outlet 76 controlled by a valve 78, and adjacent the base portion of chamber 71 is an overflow outlet 79. The arrangement of parts is further shown in Figure 3, which is merely a cross-section of Figure 2 taken along line 3—3 in the direction of the arrows.

As the returned mud 33 enters chamber 71 tangentially it whirls around helically in chamber 71 as indicated by the helical arrows, and the relatively larger and heavier particles are thrown to the wall of chamber 71 by the relatively greater centrifugal force thereon, whereas the relatively smaller and lighter particles, which are less affected by centrifugal force are displaced by the heavier fluid toward the central and upper portion of chamber 71. As a result, the underflow passing out through outlet 76 contains a concentration of the larger and heavier particles while the lighter and smaller particles enter overflow outlet 79, and pass with the portion of the liquid therein out of the base end of generally conical chamber 71, thus effecting hydraulic cyclone separation.

By the term "generally conical" it is intended to include "frusto conical" or irregularly tapered chambers having the effect of a cone, such as belled, semi-elliptical, paraboloidal, or hyperboloidal chambers, all of which have much the same separating effect.

The same type of separation occurs in each of the hydraulic cyclone separation zones 42, 43 and 44 of Figure 1, each separation depending on what materials have the largest and heaviest particles, which are separated out the underflow, and what materials have the lightest and smallest particles, or no particles at all, which are separated out the overflow. In separator 42 the material coming out the underflow 81 contains a concentration of the coarse sand in the return mud and is therefore directed into the waste material 82 in waste pit 83; whereas the remainder of the drilling mud comprising weighting material, such as barium sulfate, and fine sand and clay, water and liquid treating chemicals, passes out the overflow outlet 84 to be picked up by pump 86 and forced through manifold 87 and inlet 88 tangentially into hydraulic cyclone separator 43.

The separation in separator 43 may be facilitated, if desired, by adding water to line 89 by opening valve 91 and operating pump 92. In separator 43 the underflow emerging from underflow outlet 93 has the barium sulfate concentrated therein, while the overflow emerging from outlet 94 and picked up by pump 96 comprises a concentration of the fine sand and clay and the liquid treating chemicals and water of the drilling mud. In treating certain formations excessive quantities of various salts may be picked up, in which case the overflow from separator 43 being pumped into manifold 97 by pump 96 is not worth salvaging, in which case valve 98 is closed and valve 99 is opened, valve 101 being closed, so that said overflow in 97 is passed through manifold 102 into the waste pit 83.

However, it has been found that in many instances the salt content is not unduly high, so that it is feasible to separate the liquid treating chemicals from the fine sand and clay in hydraulic cyclone separation zone 44, and thus salvage such chemicals as alkali metal carboxymethylcellulose, sodium hydroxide, tannin, quebracho, and other well known treating agents which are in the mud in substantially liquid or substantially permanently dispersed form. This is done by closing valve 99 and opening valves 98, 101, and 103, whereupon the mixture of fine sand and clay and liquid treating agents from manifold 97 passes tangentially through inlet 104 into the separator 44 and the fine sand and clay passes out the underflow outlet valve 101 and is discharged through manifold 102 into waste pit 83, whereas the liquid chemical treating agent concentrate passes out the overflow outlet 106 and through discharge line 107 controlled by valve 103 into the treated mud 22 in pit 23. Again, separation in the separation zone 44 may be facilitated, if desired, by pumping water with pump 108 through valve 109 and line 111 along with the remaining mud through pipe 104 into separator 44.

By "powdered mineral weighting agent" it is intended to include all such known to the prior art of well drilling mud as weighting agents, such as barium sulfate (barite or barytes) $BaSO_4$, the various lead oxides, chiefly litharge PbO and red lead $Pb_3O_4$, the iron ores or iron oxides, chiefly magnetite $Fe_3O_4$ and hematite $Fe_2O_3$, and powdered iron and lead or other powdered heavy metals and their solid oxides or other water-insoluble stable compounds. In practice, barium sulfate is so superior to the others in its reduced relative corrosion of, and abrasiveness to the well equipment, that it is vastly preferred over the others.

In Figure 4 is shown a particle distribution graph of a typical hypothetical well drilling mud in which the chief solid particles are particles of clay, barium sulfate, and coarse sand. The equivalent spherical diameters of the particles is given in microns along the horizontal axis while the approximate weight percent of these given sizes are plotted along the vertical axis. While barium sulfate is chosen as the weighting agent, much the same results can be obtained with the other weighting agents named above, all being heavier than the clay or sand, and being mechanically prepared all have a narrower range of particle sizes than the sand. The term "equivalent spherical diameter" takes into account the difference in specific gravity, the specific gravity of barite being about 4.6 while that of sand and clay is about 2.4. If plotted merely on particle diameter the barium sulfate curve would move to the left and more nearly approximate the clay curve, but when the difference in specific gravity is considered the curves become as shown in Figure 4 with the barium sulfate curve separated from the clay and from the major portion of the coarse sand curve. By equivalent spherical diameter is meant the diameter the particles would have if they were all spheres of the same specific gravity in order for them to have the relative settling rates that they actually exhibit in the hydraulic separator. The centrifugal force on a particle in the hydraulic cyclone separator 42a is proportional to the product of the cube of the diameter of the particle and to the difference in the specific gravity of the particle from the specific gravity of the liquid in which it is suspended.

It will be noted that there is a sharp cutoff of the coarse sand (and cuttings classed therewith) at 200 microns which occurs when shale shaker 41 is employed, which removes all particles above that diameter. The coarse sand (being a natural product) is of all shapes and sizes, but is mainly constituted of larger and heavier particles than the barium sulfate particles. The barium sulfate, being a manufactured and specially ground product, has a relatively narrow range of particle sizes and is relatively small in particle size, being to a large extent the same particle size as a good portion of the clay, but the barium sulfate particles are much heavier than the clay particles and therefore have different equivalent spherical diameters and are therefore relatively easily separated therefrom.

A certain amount of water, barium sulfate, and treating chemicals are lost in waste pit 83 regardless of how the system is operated, so it may be desirable from time to time to replace these lost materials, which may easily be done by analyzing treated mud 22, calculating its volume, and dumping in calculated amounts of fresh supplies of the wanted materials into mud pit 23. The amount of these replacements, however, is very small and insignificant compared to the replacements necessary in the prior art when large portions of the return mud 33 were completely thrown away and replaced with fresh materials of the desired composition.

*Example*

As an example of the operation of the present invention, the returned mud 33 may have a density of 10.5 lbs./gal., contain 5.2% sand by volume, and 32% barite by weight. By maintaining a pressure drop of 40 p.s.i. across cyclone 42 the overflow in 87 has a density of 10.2 lbs./gal., 0.31% sand by weight, and 16% barite by weight, whereas the underflow in 81 has a density of 16.7 lbs./gal., and contains 76% solids by weight, 3.2% by weight of the underflow is sand, and 19% by weight of these solids is barite.

The overflow in 87 then enters cyclone 43 where a pressure drop of 150 p.s.i. is maintained across the cyclone, the overflow in 94 has a density of 9.5 lbs./gal., and contains less than 0.1% sand by volume, and 1% barite, while the underflow in 93 has a density of 18.5 lbs./gal., and contains 78% solids by weight of which 80% by weight is barite.

The overflow in 94 then enters cyclone 44 where a pressure drop of 250 p.s.i. is maintained across the cyclone, the overflow having a density of 8.9, and contains substantially no sand, and about 3.5% by weight solids which are mostly clay and undissolved chemical treating agents plus the liquid chemicals, whereas the underflow in pipe 101 has a density of 11 lbs./gal., and contains 20% solids by weight of which 2% by weight is barite.

Thus it will be seen that cyclone 42 removes and discards the coarse sand, cyclone 43 salvages the weighting agent by returning it to the treated mud, and cyclone 44 removes and discards the fine sand and clay and conserves the chemicals left by returning them to the treated mud in tank 23.

While the above example is given for a water base mud, it is obvious that solids can be removed in the same manner by the present invention from oil base muds, or from emulsion base muds (oil-in-water, or water-in-oil, emulsions), all such muds being old and well known in the prior art. After a long period of settling, the liquid can be at least partially recovered from waste pit 83, if desired.

The complete combination of parts in Figure 1 shows the invention embodied in a complete well drilling system; however, it is believed obvious that the invention is not limited to the specific embodiment which has been shown and described for illustrative purposes.

Having described our invention, we claim:

1. In a rotary well drilling process in which a fluid well drilling mud containing a mud weighting agent suspended in a liquid medium is circulated through a drilling well to remove cuttings therefrom, and said mud is returned to the surface, the cuttings removed therefrom, and the mud recycled to the well, the improvement in said removal of cuttings from the mud comprising in combination the steps of screening out of the mud all solid particles above about 200 microns in diameter, passing a substantial portion of said mud through a first hydraulic cyclone separation zone, discarding the underflow from said first zone containing a concentration of the coarse sand in said mud, passing the overflow from said first zone through a second hydraulic cyclone separation zone, returning the underflow from said second zone containing a concentration of the weighting agent to said mud recycle, passing the overflow from said second zone through a third hydraulic cyclone separation zone, discarding the underflow from said third zone containing a concentration of finer sands and clay, and returning the overflow from said third zone containing a concentration of said liquid medium to said mud recycle.

2. In a rotary well drilling process in which a fluid well drilling mud containing a mud weighting agent suspended in a liquid medium is circulated through a drilling well to remove cuttings therefrom, and said mud is returned to the surface, the cuttings removed therefrom, and the mud recycled to the well, the improvement in said removal of cuttings from the mud comprising in combination the steps of passing a substantial portion of said mud through a first hydraulic cyclone separation zone, discarding the underflow from said first zone containing a concentration of the coarse sand in said mud, passing the overflow from said first zone through a second hydraulic cyclone separation zone, returning the underflow from said second zone containing a concentration of the weighting agent to said mud recycle, passing the overflow from said second zone through a third hydraulic cyclone separation zone, discarding the underflow from said third zone containing a concentration of finer sands and clay, and returning the overflow from said third zone containing a concentration of said liquid medium to said mud recycle.

3. The process of claim 2 in which dilution liquid is added to the drilling mud passing through each hydraulic separation zone.

4. The process of claim 2 in which the weighting agent is barium sulfate.

5. A drilling mud treating system comprising in combination a receiving container for mud to be treated, a discard, and a treated mud container, a pump having an inlet from said receiving container disposed to receive drilling mud therefrom and an outlet discharging tangentially into a first hydraulic cyclone separator, said first separator having its underflow discharging into said discard and its overflow discharging tangentially into a second hydraulic cyclone separator, said second separator having its underflow discharging into said treated mud container and its overflow discharging tangentially into a third hydraulic cyclone separator, and said third separator having its underflow discharging into said discard and its overflow discharging into said treated mud container.

6. A drilling mud treating system comprising in combination a receiving container for mud to be treated, a discard, and a treated mud container, a pump having an inlet from said receiving container disposed to receive drilling mud therefrom and an outlet discharging tangentially into a first hydraulic cyclone separator, said first separator having its underflow discharging into said discard and its overflow discharging tangentially into a second hydraulic cyclone separator, said second separator having its underflow discharging into said treated mud container and its overflow discharging into said discard.

7. A drilling mud treating system comprising in combination a receiving container for mud to be treated, a discard, and a treated mud container, a pump having an inlet from said receiving container disposed to receive drilling mud therefrom and an outlet discharging tangentially into a first hydraulic cyclone separator, said first separator having its underflow discharging into said treated mud container and its overflow discharging tangentially into a second hydraulic cyclone separator, and said second separator having its underflow discharging into said discard and its overflow discharging into said treated mud container.

8. In the combination of claim 5, means to pump dilution liquid into each hydraulic cyclone separator along with the drilling mud passing tangentially thereinto.

9. In the combination of claim 6, means to pump dilution liquid into each hydraulic cyclone separator along with the drilling mud passing tangentially thereinto.

10. In the combination of claim 7, means to pump dilution liquid into each hydraulic cyclone separator along with the drilling mud passing tangentially thereinto.

11. In the combination of claim 5, means to pump mud from the receiving pit to the reconditioned mud pit, and thereby increase the capacity of the system by bypassing a portion of the drilling mud.

12. In the combination of claim 5, a rotary well drilling rig having a mud pump disposed to draw mud from said reconditioned mud pit and circulate the same through a drilling well and discharge the same into said receiving pit.

13. A drilling mud treating system comprising in combination a receiving container for mud to be treated, said mud comprising coarse sand, weighting agent, fine sand, and clay, suspended in a liquid medium, a discard, and a treated mud container, means comprising a first centrifugal separator adapted and disposed to take mud from said receiving container and to separate and discharge a portion of said mud containing a concentration of said coarse sand into said discard, and discharge the remainder of said mud, means comprising a second centrifugal separator adapted and disposed to receive said remainder of said mud from said first separator and to separate and discharge a portion of said mud containing a concentration of said weighting agent into said treated mud container, and discharge the remainder of said mud, and means comprising a third centrifugal separator adapted and disposed to receive said remainder of said mud from said second separator and to separate and discharge a portion of said mud containing a concentration of said fine sand and clay into said discard, and discharge the remainder of said mud into said treated mud container.

14. A drilling mud treating system comprising in combination a receiving container for mud to be treated, said mud comprising coarse sand, and weighting agent, suspended in a liquid medium, a discard, and a treated mud container, means comprising a first centrifugal separator adapted and disposed to take mud from said receiving container and to separate and discharge a portion of said mud containing a concentration of said coarse sand into said discard, and discharge the remainder of said mud, and means comprising a second centrifugal separator adapted and disposed to receive said remainder of said mud from said first separator and to separate and discharge a portion of said mud containing a concentration of said weighting agent into said treated mud container, and discharge the remainder of said mud into said discard.

15. A drilling mud treating system comprising in combination a receiving container for mud to be treated, said mud comprising weighting agent, fine sand, and clay, suspended in a liquid medium, a discard, and a treated mud container, means comprising a first centrifugal separator adapted and disposed to take mud from said receiving container and to separate and discharge a portion of said mud containing a concentration of said weighting agent into said treated mud container, and discharge the remainder of said mud, and means comprising a second centrifugal separator adapted and disposed to receive said remainder of said mud from said first separator and to separate and discharge a portion of said mud containing a concentration of said fine sand and clay into said discard, and discharge the remainder of said mud into said treated mud container.

16. The process of treating a well drilling mud comprising solid particles above 200 microns in diameter, coarse sand, weighting agent, fine sand, and clay, suspended in a liquid medium, comprising the steps of screening the solid particles above about 200 mesh out of said mud, centrifugally separating and discarding a concentration of said coarse sand from said screened mud, centrifugally separating and preserving a concentration of said weighting agent from the then remaining portion of said mud, centrifugally separating and discarding a concentration of said fine sand and clay from the then remaining portion of said mud and combining said last then remaining portion of said mud with said concentration of weighting agent to form a treated mud.

17. The process of treating a well drilling mud comprising coarse sand, weighting agent, fine sand, and clay, suspended in a liquid medium, comprising the steps of centrifugally separating and discarding a concentration of said coarse sand from said mud, centrifugally separating and preserving a concentration of said weighting agent from the then remaining portion of said mud, centrifugally separating and discarding a concentration of said fine sand and clay from the then remaining portion of said mud and combining said last then remaining portion of said mud with said concentration of weighting agent to form a treated mud.

References Cited in the file of this patent

UNITED STATES PATENTS

| | | |
|---|---|---|
| 2,156,333 | Cross et al. | May 2, 1939 |
| 2,225,973 | Brown et al. | Dec. 24, 1940 |
| 2,781,910 | Fontein | Feb. 19, 1957 |